United States Patent
Engström et al.

(10) Patent No.: US 9,893,673 B2
(45) Date of Patent: Feb. 13, 2018

(54) METHOD AND SYSTEM FOR USE IN DYNAMOMETER TESTING OF A MOTOR VEHICLE

(71) Applicant: Rototest International AB, Rönninge (SE)

(72) Inventors: Nils G. Engström, Rönninge (SE); Jonny Färnlund, Skärholmen (SE); Christian Engström, Tyresö (SE)

(73) Assignee: Rototest International AB, Ronninge (SE)

( * ) Notice: Subject to any disclaimer, the term of this patent is extended or adjusted under 35 U.S.C. 154(b) by 0 days.

(21) Appl. No.: 15/101,640

(22) PCT Filed: Dec. 9, 2014

(86) PCT No.: PCT/SE2014/051472
§ 371 (c)(1),
(2) Date: Jun. 3, 2016

(87) PCT Pub. No.: WO2015/088429
PCT Pub. Date: Jun. 18, 2015

(65) Prior Publication Data
US 2016/0308484 A1  Oct. 20, 2016

(30) Foreign Application Priority Data

Dec. 9, 2013 (SE) .................. 1351469

(51) Int. Cl.
*G05B 5/00* (2006.01)
*H02P 29/00* (2016.01)
(Continued)

(52) U.S. Cl.
CPC ....... *H02P 29/005* (2013.01); *G01M 17/0074* (2013.01); *H02H 9/041* (2013.01);
(Continued)

(58) Field of Classification Search
CPC .......................... G01M 17/0072; H02P 29/64
See application file for complete search history.

(56) References Cited

U.S. PATENT DOCUMENTS

| 4,669,318 A |   | 6/1987 | Ångström |
| 5,385,042 A | * | 1/1995 | La Belle ................. G01L 3/22 73/116.06 |

(Continued)

FOREIGN PATENT DOCUMENTS

| WO | WO 2007/133154 A1 | 11/2007 |
| WO | WO 2011/095182 A1 | 8/2011 |
| WO | WO 2012/053966 A1 | 4/2015 |

*Primary Examiner* — Karen Masih
(74) *Attorney, Agent, or Firm* — Blank Rome LLP

(57) ABSTRACT

The present invention relates to a method for use in dynamometer testing of a vehicle (100), the vehicle (100) including at least a first wheel shaft and at least one first vehicle power source for providing power to said first wheel shaft, said first wheel shaft being connected to a vehicle dynamometer system, said vehicle dynamometer system comprising a first controllable dynamometer power source (201) for providing power to said first wheel shaft, said first dynamometer power source being an electrical machine (201) comprising a stator and a rotor, said stator comprising a stator winding. The method includes: determining whether a first temperature ($T_1$) is below a first temperature limit ($T_{lim1}$), and heating said electrical machine (201) by applying a current ($I_{heat}$) to said stator winding when said first temperature ($T_1$) is below said first temperature limit ($T_{lim1}$).

18 Claims, 4 Drawing Sheets

(51) Int. Cl.
  *G01M 17/007* (2006.01)
  *H02P 29/62* (2016.01)
  *H02P 29/64* (2016.01)
  *H02K 15/12* (2006.01)
  *H02H 9/04* (2006.01)

(52) U.S. Cl.
  CPC ........... *H02K 15/125* (2013.01); *H02P 29/62* (2016.02); *H02P 29/64* (2016.02)

(56) References Cited

U.S. PATENT DOCUMENTS

| | | |
|---|---|---|
| 5,502,362 A | 3/1996 | Brandes |
| 7,743,650 B2 | 6/2010 | Engström |
| 8,001,835 B2 | 8/2011 | Engström |
| 8,387,449 B2 | 3/2013 | Engström et al. |
| 8,689,618 B2 | 4/2014 | Engström |
| 2010/0156338 A1 | 6/2010 | Lu et al. |
| 2013/0271060 A1 | 10/2013 | Messersmith et al. |
| 2013/0283900 A1 | 10/2013 | Engstrom et al. |
| 2014/0331980 A1 | 11/2014 | Engström |

\* cited by examiner

METHOD AND SYSTEM FOR USE IN DYNAMOMETER TESTING OF A MOTOR VEHICLE

FIELD OF THE INVENTION

This invention relates to dynamometer testing of vehicles, and in particular to a method for use when dynamometer testing vehicles having at least one wheel shaft and a power source for applying power to said first wheel shaft.

BACKGROUND OF THE INVENTION

Dynamometer testing of vehicles is known per se, and can, for example, be carried out by roller type (rolling road) dynamometers equipped with large rollers that support the vehicle wheels, and which are used to apply a brake torque to the drive wheels of the vehicle. Such systems, however, are not always capable of providing the desired measurement accuracy and/or freedom of measurement.

Another kind of vehicle dynamometer systems for dynamometer testing of vehicles is disclosed in U.S. Pat. No. 4,669,318 (Ångstrom). This document relates to an apparatus for dynamometer testing of vehicles, where load absorbing means in the form of a hydrostatic pump assembly has an input shaft for engagement with a drive shaft of a vehicle to be tested. Each drive shaft is fixedly connected to an individual apparatus of this kind, whereby a total effective torque from the vehicle can be accurately measured.

It is also possible to perform more complex tests using a dynamometer testing system of the above kind, both for two-wheel drive systems, and also for four-wheel drive systems. Such more complex testing, using a system of the above kind, is disclosed in the International patent application WO2007/133154 A1 (Engstroem).

However, vehicle transmissions are becoming increasingly complex, and may include various kinds of power sources for providing power to wheel shafts of the vehicle. These power sources can be arranged to provide propelling powers, but also braking powers, e.g. when used for regenerative braking. The increased complexity of vehicle transmissions provides corresponding challenges for dynamometer testing systems. Furthermore, there is also an increasing desire to perform measurements that allows testing taking into account situations that may occur during real life driving of the vehicle on a road, such as climate related conditions that may affect the behavior of the vehicle.

Aim and Most Important Features of the Invention

It is an object of this invention to provide a method for use in dynamometer testing of vehicles that allows use of cost-efficient dynamometer solutions when testing vehicle behavior in various conditions.

According to the present invention, it is provided a method for use in dynamometer testing of a vehicle, the vehicle including at least a first wheel shaft and at least one first vehicle power source for providing power to said first wheel shaft, said first wheel shaft being connected to a vehicle dynamometer system, said vehicle dynamometer system comprising a first controllable dynamometer power source for providing power to said first wheel shaft, said first dynamometer power source being an electrical machine comprising a stator and a rotor, said stator comprising a stator winding and said method including:

determining whether a first temperature is below a first temperature limit, and heating said electrical machine by applying a current to said stator winding when said first temperature is below said first temperature limit.

As was mentioned above, there is an increasing desire to perform dynamometer measurements of vehicles that allows accurate measurement of various vehicle characteristics taking into account numerous situations that may occur during actual driving of the vehicle on a road. Vehicle testing in general often includes testing in various conditions, for example, in extreme weather conditions, e.g. very warm or very cold conditions. These tests are often performed in locations exhibiting the desired climate, e.g. polar regions for cold condition testing. These tests are often necessary to ensure that the vehicle will have a reliability and behavior that fulfills expectations of the manufacturer and also of the user. However, the areas providing suitable test conditions are often rural and remote, with high costs associated with carrying out desired tests. It is therefore desired that at least part of the tests can be performed without the need for relocation to such rural regions. This is made possible by test cells where the temperature e.g. can be controlled to desired temperatures. For example, temperatures in the order of 30-40 degrees below zero can be obtained in such test cells, thereby enabling various vehicle, as well as fuel, behaviors to be tested at low temperatures without the need for actual relocation to colder environments.

These extreme conditions in the test cell, however, provide challenges also to the equipment being used for testing the vehicle. For example, accurate testing of vehicles having advanced drive trains such as e.g. hybrid vehicles and electrical vehicles, may require dynamometer test units being capable of absorbing power from, as well as providing a propelling power to, wheel shafts of the vehicle. This can be accomplished in various ways, e.g. by the use of an electrical machine. Electrical machines are capable providing both braking and propelling torque with high accuracy, and are consequently suitable for use in testing of various vehicle functions. For example, e.g. a hybrid drive vehicle can be tested not only for accelerations, but also for complete test drives, with uphill as well as downhill driving.

However, use of electrical machines in low ambient temperatures, e.g. ambient temperatures below 0° C., −10° C. or −20° C., such as e.g. temperatures in the interval 0° C.--50° C.; −10° C.--50° C.; or −20° C.--50° C., for testing e.g. vehicle behaviour in cold weather conditions, imposes high requirements on the machines in order to work properly at these temperatures. This, in turn, results in costly vehicle dynamometer systems due to requirements of especially designed machines. According to the present invention, it is provided a method for use in dynamometer testing of vehicles that allows use standard electrical machines, such as three-phase asynchronous induction motors, without requirements of being capable of operating at low temperatures according to the above.

This is accomplished by heating the electrical machine prior to commencing testing by applying a current to a stator winding of the electrical machine when some suitable temperature is below a temperature limit. This has the advantage that the electrical machine can be heated to, or be arranged to maintain, temperatures allowing desired operation while still being installed in environments in which the electrical machine is not designed to work. The invention consequently allows heating of the electrical machine from a lower temperature to operating temperatures prior to commencing testing of the vehicle so that the temperature of the electrical machine can be maintained or increased by means of said heating.

With regard to said first temperature being used for evaluating the need for heating of the electrical machine, this temperature can, for example, be an ambient temperature of the machine, hence a temperature representing surroundings of said electrical machine. This temperature can be measured at some suitable location e.g. inside a test cell in which the electrical machine is located. Alternatively, the temperature can be a temperature representing a temperature of said electrical machine, e.g. measured at some suitable location in or at the electrical machine. As is further explained below, said first temperature can also be an estimated temperature, e.g. representing an average temperature of the electrical machine, or some representing some other suitable that is not being directly measured through the use of temperature sensors. According to one embodiment, a combination of one or more temperatures can be used to determine the need for heating of the electrical machine. Said first temperature can e.g. be a temperature equal to or below one of: ten degrees Celsius, five degrees Celsius, zero degrees Celsius.

Said first temperature can also be dependent on the temperature interval in which the electrical machine is designed for operation, and e.g. be a temperature below which the electrical machine will operate outside the temperature interval in which the electrical machine is designed for operation, or a temperature being some suitable temperature above the lower limit of the temperature interval in which the electrical machine is designed for operation.

When a current is applied to a stator winding, this stator winding will be subjected to a high temperature increase due to the applied current. This temperature increase, however, may not be representative of the heating of the electrical machine when taken as a whole. That is, the stator winding temperature will quickly reach higher temperatures than other portions of the electrical machine.

This, in turn, means that if the temperature of the stator winding alone, or a temperature measured at a location being directly subjected to the increased temperature of the stator winding, is used as a representation of the machine temperature, the machine temperature might be determined as being higher than what is actually the case. In particular, there is a risk that a determination would be made, where it is concluded that the machine temperature is relatively high while in reality the average machine temperature still is low.

Consequently, there is a risk that the electrical machine would be determined as heated to a satisfactory extent while in reality this is not the case. Furthermore, there is oftentimes a maximum stator winding temperature that should not be exceeded in order to avoid temperature dependent wear/damages.

According to one embodiment of the present invention, therefore, a representation, or model, of the heat transfer in the electrical machine is used to estimate a machine temperature that more accurately reflects the actual average machine temperature. As was mentioned above, this estimated temperature can, for example, be the average temperature of the electrical machine or some other suitable temperature.

The use of a representation of the heat transfer in the machine makes it possible to estimate the manner in which supplied energy, converted to heat in the windings, changes the machine temperature with time. This also allows an accurate average machine temperature to be determined. With regard to the representation, any suitable representation can be used, such as a thermodynamic model of the electrical machine or other suitable mathematical model or a representation being determined by empirical measurements.

When using an empirical representation of the heat transfer in the machine, for example, the machine temperature in various locations can be measured and monitored as a function of supplied energy to establish the manner in which the heat transfer in the machine takes place so that an accurate representation of the temperature variations of the machine as a function of supplied energy can be obtained.

According to one embodiment, a current is applied to a stator winding until the stator winding temperature, or the temperature of some other location being directly subjected to the heat generated in the windings, reaches some temperature limit, e.g. a temperature limit that is determined from a wear/damage point of view according to the above, and when this temperature has been reached, the supply of energy is interrupted until the stator winding temperature has fallen to some other suitable temperature, e.g. until the temperature has fallen a number of degrees and/or fractions of degrees in the range 0,1-10 degrees, whereupon the current is again applied until said first temperature is reached. This can be repeated until it is determined, by means of the representation of the heat transfer of the machine, that the machine has reached the desired temperature.

The heat being generated in the stator winding will be transferred through the machine in dependence of the materials being used in the machine and the specific heat capacity of the materials. Further, the heat will be transferred towards the outer housing of the machine where it will be dissipated through cooler ambient air. Hence, the heating of the machine will be dependent on the ambient air temperature as well. The cooling off of the machine is also dependent on the design of the machine, and surface area being exposed to the surrounding air. These factors can be taken into account by the representation of the heat transfer in the machine so that inner machine temperatures can be accurately determined.

The current intensity of the current that is applied to the stator winding can be arranged to always be the same, or alternatively the current intensity can be determined based on said one or more temperatures. The applied current can also be arranged to vary during heating of the electrical machine, and e.g. be larger in the beginning of the heating to be reduced as the temperature of the machine increases.

According to one embodiment, a combination of one or more temperatures is used to determine a suitable current to be applied to said stator winding.

The applied current is preferably such that the rotor is not rotated, i.e. standing still. This can be accomplished by supplying a DC current to one or more of the phase windings of the stator winding. The electrical motor can also be e.g. a three phase motor having three phase windings and not being capable of starting when only one phase winding is being powered. In such situations, the phase winding can be provided with an alternating current and still not being able to start while still being heated.

In general, heating is obtained as a result of the fact that the efficiency is not 100%. However, when no work is produced, the supplied energy is converted to heat. According to the present invention, a zero-frequency torque can be applied, that is, a holding torque can be applied, i.e. a torque that must be overcome in order to set the rotor of the electrical machine in motion. This holding torque can be high, and when the applied torque is not taken out as mechanical work, the power providing the holding torque will be converted to heat in the windings, instead.

According to one embodiment, the heating of the electrical machine is arranged such that the rotor is not necessarily standing still but the rotational speed of the rotor is kept below a first speed. This can be accomplished by applying a current having a frequency such that the rotational speed of said rotor is being kept below a first speed, e.g. 10 rpm or 100 rpm. This can be accomplished e.g. by means of a frequency inverter. In this case, all phase windings can be powered, although by a current having a low frequency.

When heating the electrical machine it can be determined whether a temperature of said electrical machine is above a second temperature, said second temperature being equal to or higher than said first temperature, and reducing said first current when said temperature of said electrical machine is above said second temperature. The current can be reduced to any suitable current, e.g. 0 A, the heating hence being turned off.

The method according to the invention can also include continuously controlling said first current such that said temperature of said electrical machine is kept at or above said first or second temperature.

Said second temperature can, e.g., be some suitable temperature in the temperature range in which the electrical machine is designed to operate, and e.g. be a temperature above zero degrees Celsius, above five degrees Celsius, or above ten degrees Celsius. The second temperature can, for example, be determined through the use of a representation of the heat transfer in the electrical machine.

The resulting supplied power can be substantial, and e.g. be in the order of 1-100%, or 10-100% of the nominal power of the electrical machine.

The dynamometer test unit may also be of a kind having two (or more) dynamometer power sources for providing power to a same wheel shaft of the vehicle, at least one of said power sources being an electrical machine. This kind of dynamometer test units may allow a more favourable design with respect to cost/space/infrastructure requirements than would be the case with a single power source having the total capability of the two dynamometer power sources taken together.

Further features of the present invention and advantages thereof will become clear from the following detailed description of illustrative embodiments and from the attached drawings.

BRIEF DESCRIPTION OF THE DRAWINGS

The invention will now be described in greater detail with reference to the drawings, wherein.

DESCRIPTION OF EXEMPLARY EMBODIMENTS

Figure 1:
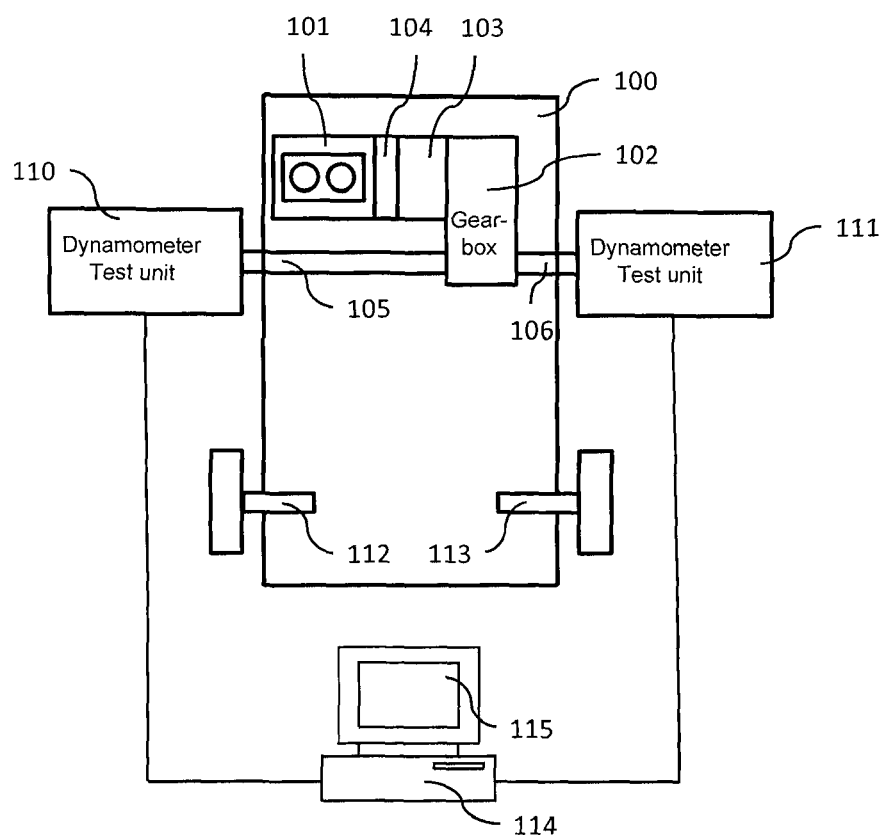
FIG. 1 shows an exemplary vehicle dynamometer system according to the present invention.

FIG. 1 discloses a vehicle 100 set up for being tested with a vehicle dynamometer system according to the present invention.

The vehicle 100 is a two-wheel drive vehicle, and includes front axle wheel shafts 105, 106, and rear axle wheel shafts 112, 113. The wheels of the vehicle 100 are not shown due to the vehicle being set up for dynamometer testing.

The disclosed vehicle 100 includes a drive train, which includes a combustion engine 101 which is connected to a gearbox 102. The gearbox 102 can be of any suitable kind and, e.g., consist of a manual transmission or an automatic transmission. The front axle wheel (drive) shafts 105, 106 extend from the gear box to the front axle wheels of the vehicle 100.

The vehicle 100 further includes an electric motor 103, which is connected in series with the combustion engine upstreams of the gearbox 102, but downstreams a clutch 104.

A vehicle dynamometer system is connected to the vehicle 100, and includes dynamometer test units 110, 111. The dynamometer test units 110, 111 are connected to a measuring and control system 114, such as e.g. a computer with associated display 115, by means of which the tests are controlled, and by means of which an operator of the system can initiate tests and provide necessary information for performing the dynamometer tests.

During testing, the measuring and control system 114 transmits control signals to the dynamometer test units to request desired torque and rotational speed. Torque and rotational speed can be measured in different ways, as explained below. The dynamometer test units 110-111 can consist of substantially identical test units, and are described more in detail in FIG. 2. The measuring and control system 114 can also be arranged to control heating of the electrical machine according to the present invention.

Figure 2:
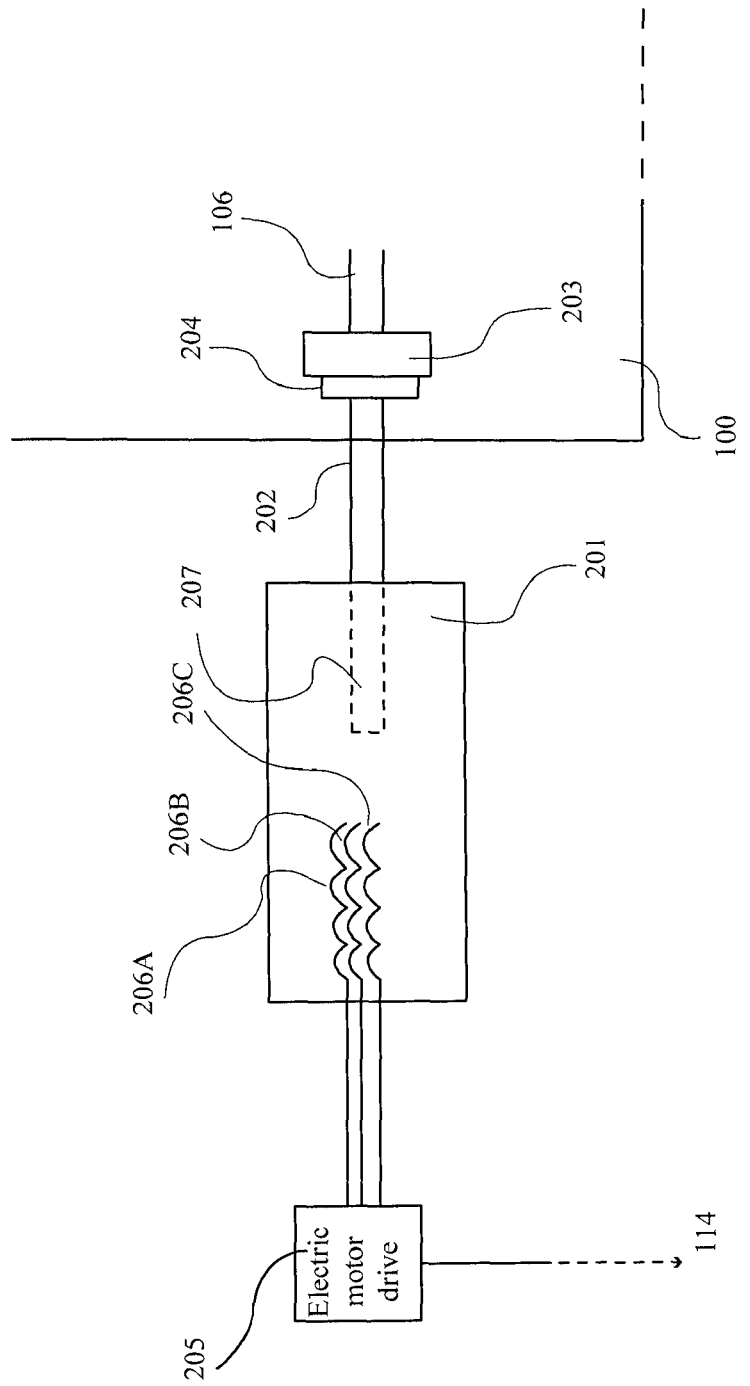
FIG. 2 shows a dynamometer test unit of the system disclosed in FIG. 1 more in detail.

FIG. 2 shows an example of a test unit 111 according to the present invention, each dynamometer test unit 110, 111 includes an electrical machine 201 and means for measuring the torque applied to an output shaft 202 of the electrical machine. This torque can be arranged to be measured by means of a torque transducer utilizing strain gauges and/or using the electrical drive system that is used to control the electrical machine according to the below. The electrical machine output shaft 202 is arranged to be rigidly connected to a drive shaft 106 of the vehicle 100. The rigid connection can be accomplished, e.g. by removing the vehicle wheel and attaching the output shaft 202 of the electrical machine 201 to the wheel hub 203, directly or by means of a suitable adapter 204, so as to obtain a rigid connection between vehicle 100 and dynamometer test unit 111 in a simple manner utilizing the existing wheel fasteners of the vehicle 100. The rigid connection has, inter alia, the advantage that rotational speed of the wheel shaft can be measured by a suitable sensor measuring rotational speed of the output shaft 202 of the electrical machine 201.

The dynamometer test units 111, 112, which e.g. can be standing freely on a floor, are thus connected to the vehicle only by means of a (rigid) coupling to the wheel shafts (wheel hubs) (and possibly some kind of electronic wire connection for communication with the vehicle control system), and hence preferably also "carry" the weight of the vehicle in place of the wheel that has been taken off. This is known per se e.g. from earlier patent applications of one or more of the inventors of the present invention. Also the testing is known per se e.g. from earlier patent applications of one or more of said inventors.

The electrical machine (electric motor) 201 is power supplied via a power grid by means of an electric motor drive 205, and can constitute e.g. an AC motor, and in the present example the electrical machine 201 is a three-phase low inertia induction motor having a rotor 207 and a stator with a stator winding consisting of three phase windings 206A, 206B, 206C. The electric motor drive 205 is controlled by the measuring and control system 114 so that the electric motor 201 can be set to a desired rotational speed and torque. In the figure, the electric motor drive 205 is shown as being arranged separate from the electric motor 201, e.g. mounted on a wall or as a free standing cabinet, and connected to the electric motor 201 by means of one or more cables.

With regard to electric motors of the disclosed kind, there exist industrial drives that can be used to very accurately control the speed and load torque of electric motors, and which can advantageously be used when implementing a dynamometer test unit according to the present invention. Such drives often involve direct torque control, DTC, which allows the torque of the electric motor to be the primary control element and not the motor current.

The torque of the electric motor, be it a load torque or propelling torque for use when testing regenerative braking according to the following, can be controlled from zero to full torque within a very short period of time, e.g. milliseconds, which thus makes such drives very suitable for dynamometer testing of vehicles. The applied torque can also be speed controlled and hence be applied for any rotational speed also at stand still.

Vehicle dynamometer systems of the disclosed kind are favourable e.g. for use when testing vehicles having a drive train with one or more electric motors, e.g. hybrid vehicles, e.g. of the kind disclosed in FIG. 1.

As is known to a person skilled in the art, there exist various kinds of electric hybrid drives, and the present invention can be utilized in testing of any such kind. Furthermore, the invention is not limited to use in connection with hybrid vehicles, but can be utilized whenever the dynamometer test unit comprises an electrical machine, and e.g. be used in testing of electric vehicles and conventional combustion engine vehicles as well.

As was mentioned above, sophisticated drive trains, e.g. of the kind disclosed in FIG. 1, in combination with a desire for sophisticated measurements, impose demands of the performance of the vehicle dynamometer. Many such demands can be fulfilled by the use of electrical machines, which can be used as power-absorbing means as well as being able to provide propelling power, e.g. to enable simulation of regenerative braking. However, as stated above, there is a desire to perform tests of vehicles also while simulating driving in extreme weather conditions, such as e.g. very low temperature conditions. This imposes further demands on the vehicle dynamometer system, and e.g. electrical machines are often not designed for operation in temperatures below zero degrees Celsius. According to the present invention, measurements of vehicle performance in such conditions using standard electrical machines by the use of heating the electrical machine using its stator winding.

Figure 3:
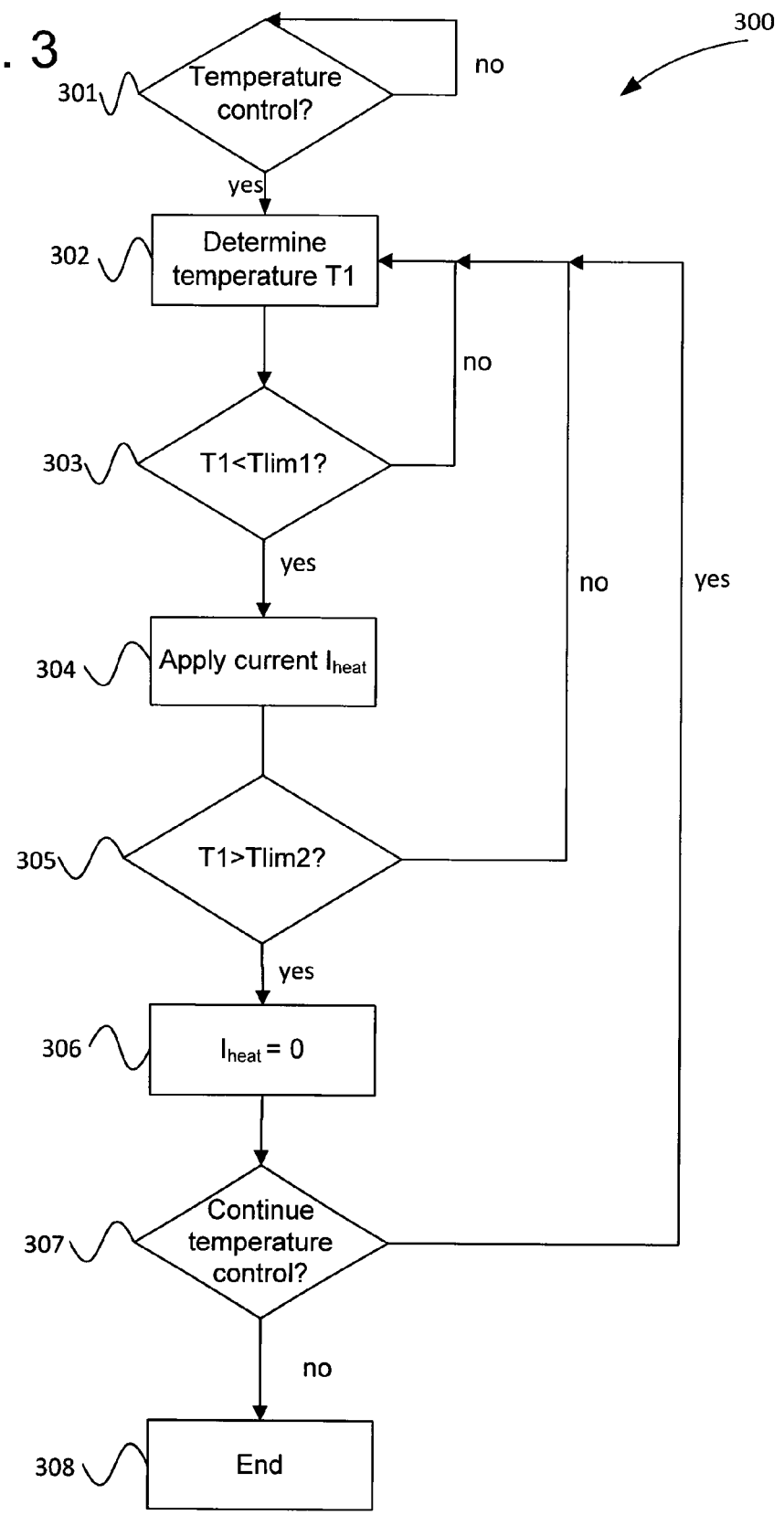
FIG. 3 shows an exemplary method according to the present invention.
Figure 4:
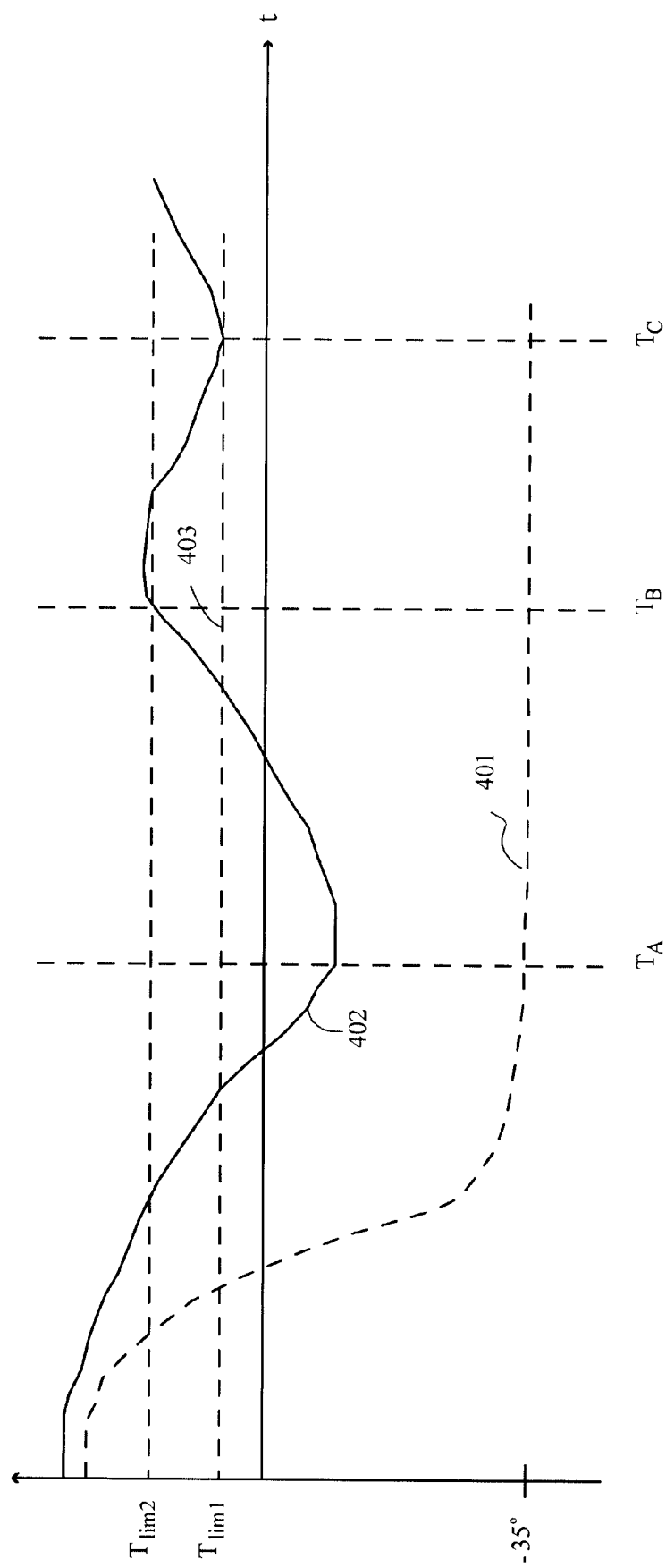
FIG. 4 shows a temperature graph over the temperature of an exemplary electrical machine when heated according to the present invention.

An exemplary method 300 according to the invention is shown in FIG. 3. The method is also illustrated by FIG. 4, which shows temperature variations for a test cell in which the vehicle dynamometer system is located (dashed line 401) according to the present example, and the temperature representing the electrical machine (solid line 402). FIG. 4 also shows a first temperature limit $T_{lim1}$ and a second temperature limit $T_{lim2}$. The method starts in step 301, corresponding to time $T_A$ in FIG. 4, where it is determined whether the method for controlling the temperature of the electrical machine 201 is to be carried out. When this is the case, the method continues to step 302. The transition from step 301 to step 302 can, for example, be controlled by the control system of the vehicle dynamometer system. For example, the heating can be arranged to begin some time before actual testing is to begin to ensure that the electrical machine reaches proper working temperature before testing is started. The heating can also be arranged to be performed e.g. when the temperature in a test cell is being lowered so that the electrical machine is never cooled to the temperature prevailing in the test cell. This is illustrated in FIG. 4, where the temperature of the test cell is shown as being reduced to a temperature of approximately −35° C.

In step 302, a first temperature $T_1$ is determined, which, e.g., can be an ambient temperature of the machine, e.g. a temperature representing the temperature in the test cell. This temperature can be measured at some suitable location, and need not be measured in the immediate vicinity of the electrical machine, as long as the temperature is representative of the temperature at the location of the electrical machine 201. Alternatively, and perhaps more preferably, the temperature $T_1$ can be a temperature representing a temperature of said electrical machine 201, e.g. measured at some suitable location in or at the electrical machine 201. It is also possible to use signals from a plurality of temperature sensors when determining said first temperature, where, e.g. a weighted value of two or more sensors can be used to determine a temperature of the electrical machine.

As was mentioned above, when a current is applied to a stator winding, the stator winding will be subjected to a high and relatively quickly occurring temperature increase due to the applied current, thereby rendering temperature measurements in the vicinity of windings in which current flow unsuitable as representations of actual machine temperature, since e.g. the rotor may still be substantially unaffected by the supplied energy. For this reason, the temperature $T_1$ can be arranged to be determined through the use of a representation of the heat transfer in the electrical machine. The representation of the heat transfer in the machine is then used to estimate changes in machine temperature with time, and in particular with regard to supplied energy through the applied current. The temperature $T_1$ can be arranged to represent any suitable temperature at any suitable location in the machine. For example, the temperature $T_1$ can be arranged to represent an average temperature of the electrical machine, or some other suitable temperature, such as a rotor temperature, that is not directly determined as a reading from a temperature sensor.

As was mentioned above, any suitable representation of the heat transfer can be used, such as a thermodynamic model of the electrical machine or other suitable mathematical model or a representation being determined by empirical measurements. For example, the energy being input into the machine can be described as:

$$Q = P\Delta t \qquad \text{eq. (1)}$$

where
  Q represents the input energy,
  P represents the applied electrical power,
  Δt represents the time during which a current (power) is applied.

The heating of the machine will then be dependent from, and according to the present embodiment, also controlled from:

$$Q = mc_p \Delta T, \qquad \text{(eq. 2)}$$

where
  m represents the mass of the electrical machine,
  $c_P$ represents the specific heat capacity of the electrical machine, which is dependent on the materials being used in the machine. The specific heat capacity has been determined for most materials, and specific heat capacities for various materials are available in look-up form. Hence the total, or average, specific heat capacity of the engine can be determined in a straight forward manner.

$\Delta T$ represents the temperature raise, expressed in Kelvin.

Consequently, e.g. an average temperature increase of the electrical machine can be determined from eqs. 1-2, and the equations can also be used to determine a present temperature based on supplied energy. According to one embodiment, these equations, or another model providing similar possibilities, can therefore be used to calculate said first temperature $T_1$ when said first temperature $T_1$ represents e.g. an average temperature of the electrical machine.

Furthermore, a desired temperature increase can be determined, e.g. from a starting temperature, and a desired total energy to be supplied to the electrical machine can be calculated from the desired temperature increase. When starting the heating, an initial temperature of the electrical machine can be determined as a start value of the representation being used in order to determine the amount of energy to be supplied. This start value can be determined e.g. from an estimation of a temperature, e.g. an average temperature, of the electrical machine. For example, the start value can be determined as the average of a stator winding temperature and an ambient temperature. When these temperatures are the same, it can be assumed that the average machine temperature equals the ambient temperature, while when the temperatures differ, the average temperature of the stator winding temperature and the ambient temperature can be used as a representation of the average machine temperature when starting the heating.

Returning to the method in FIG. 3, the method then continues to step 303, where said first temperature $T_1$, determined e.g. according to any of the above examples, is compared with a first temperature limit $T_{lim1}$. The first temperature limit $T_{lim1}$ can be a temperature below which operation of the electrical machine during testing is not desired. The temperature limit $T_{lim1}$ can, for example, be a desired average temperature of the machine. As long as the temperature $T_1$ is higher than the first temperature limit $T_{lim1}$, the method returns to step 302. When the temperature $T_1$ is lower than the temperature limit $T_{lim1}$, which is generally the case in situations where the need for heating is expected, the method continues to step 304, where heating of the electrical machine is initiated (the steps 301-303 are considered instantaneous with regard to FIG. 4, and hence heating is commenced at time $T_A$) by applying a current $I_{heat}$ to the stator winding by applying the current $I_{heat}$ to at least one of the phase windings 206A, 206B, 206C. According to one embodiment, all phase windings are powered by a DC current.

The applied current $I_{heat}$ can be a fixed current, or be determined e.g. in relation to said first temperature $T_1$, where e.g. higher currents can be used for lower temperatures when more energy needs to be provided in order to obtain the desired heating. That is, $I_{heat}$ can constitute a function of $T_1$. The current $I_{heat}$ can be DC current that is supplied to one or more of the phase windings 206A, 206B, 206C. The current $I_{heat}$ can be of such magnitude that the resulting power e.g. is in the order of 1-100%, or 10-100%, of the power rating of the electrical machine. Since no work will be produced by the electrical machine the generated power will be converted to heat heating the electrical machine.

It is also possible to use an alternating current, and e.g. in the case of the electrical machine 201 being a three phase motor as in the present example the motor will not be capable of starting when only one phase winding is being powered. Consequently, in such situations, the phase winding can be provided with an alternating current and still not being able to start while still being heated.

According to one embodiment, a holding torque is applied, which can be high, and thereby cause a large energy transfer into the machine, which, since this torque is not taken out as mechanical work, will be converted to heat in the windings.

It is also possible to feed the stator winding with an alternating current having a frequency such that the rotational speed of the electrical motor (rotor) is kept below some suitable speed, e.g. 10 or 100 rpm. This can be accomplished in a simple manner since the drive system is systems of the disclosed kind are capable of controlling the rotational speed from zero rpm. Consequently, all phase windings can be powered according to one embodiment.

When heating has been commenced in step 304, the method continues to step 305 to determine whether the temperature $T_1$ is above a second temperature limit $T_{lim2}$. The temperature $T_{lim2}$ can be a temperature being higher, e.g. considerably higher, than the temperature $T_{lim1}$ as shown in FIG. 4, but can also correspond to the temperature $T_{lim1}$. For as long as the temperature is below the temperature limit $T_{lim2}$ the method returns to step 302, and heating continues, where the applied current continuously can be adjusted based on the current temperature of the electrical machine $T_1$, e.g. calculated according to the equations above. When the temperature $T_1$ is above said second temperature limit $T_{lim2}$, as shown at $T_B$ in FIG. 4, the heating is stopped by reducing the current $I_{heat}$ to zero in step 306.

During heating, the temperature in the stator winding may reach undesired levels. That is, if a high electrical power is applied to the stator winding during stand still, the stator winding may reach temperature levels where temperature related damages may occur. Therefore, according to one embodiment, a current is applied to the stator winding until the stator winding temperature reaches some temperature limit $T_{lim3}$, e.g. a temperature limit that is determined from a wear/damage point of view.

When this temperature $T_{lim3}$ has been reached, which is higher than the temperature limit $T_{lim2}$, the supply of energy is interrupted until the stator winding temperature has fallen to some other suitable temperature, e.g. by some suitable percentage of the temperature limit $T_{lim3}$, or some suitable number of degrees, e.g. a number of degrees and/or fractions of degrees in the range 0,1-10 degrees, whereupon the current is again applied until said temperature $T_{lim3}$ is reached. This can be repeated until it is determined in step 305 that the temperature $T_1$ has reached said second temperature limit $T_{lim2}$.

The method then continues to step 307, where it is determined whether the control of the temperature of the electrical machine is to be stopped, which e.g. can be the case if the testing of the vehicle is about to start. According to one embodiment, the temperature control is continued also during testing if required, which e.g. can be the case if low loads are applied in combination with low ambient temperatures. If the method is to be stopped the method ends in step 309, otherwise it returns to step 302 for continued control, where heating can be arranged to begin again when the temperature of the electrical machine has decreased to temperature $T_1$, indicated at TC in FIG. 4. Consequently, the temperature of the electrical machine can e.g. be arranged to be varying in the interval between temperatures $T_{lim1}$ and $T_{lim2}$. The dynamometer test units of the vehicle dynamometer system can be simultaneously or individually controlled.

The present invention, consequently, provides a system that is very advantageous for use when testing vehicles in cold environments, and which ensures use of cost-efficient solutions since the electrical machine need not be designed for cold condition operation.

According to the above, each dynamometer test unit comprises a single power source consisting of an electrical machine. According to one embodiment, the dynamometer test unit comprises two or more individually controllable power sources, at least one of which being an electrical machine, the other e.g. being a hydraulic pump or an electrical machine. If two or more electrical machines are used for a single dynamometer test unit, these can be simultaneously or individually temperature controlled according to the present invention.

Above, the present invention has been exemplified in connection with testing of a hybrid drive vehicle. Naturally, the present invention is applicable for testing of any kind of vehicle, such as a conventional two or four wheel drive combustion engine vehicle, or any other kind of hybrid vehicle other than what has been disclosed above. Consequently more than two dynamometer test units can be used and temperature controlled according to the invention.

As is apparent from the above, the term power source means a power source that is capable of subjecting a wheel shaft to a power (torque), be it a propelling (positive) torque or braking (negative) torque or combination of both.

The present invention can be implemented e.g. in the measuring and control system 114, or the drive unit controlling the electrical machine. The method can further be realized by the use of programmed instructions. These programmed instructions typically consist of a computer program which, when it is executed in a computer or control unit, causes the computer/control unit to perform the desired control, such as method steps according to the present invention.

The computer program is usually part of a computer program product, where the computer program product comprises a suitable storage medium with the computer program stored on said storage medium. Said storage medium can be a non-transient storage medium.

Finally, it should be understood that the present invention is not limited to the embodiments described above, but relates to and incorporates all embodiments within the scope of the appended independent claims. For example, the present invention has been exemplified for being used in a test cell in which temperature is controlled to low temperatures. It is also contemplated that the testing is performed in locations where the temperature is actually at such low temperatures that use of the present invention is advantageous.

The invention claimed is:

1. Method for use in dynamometer testing of a vehicle, the vehicle including at least a first wheel shaft and at least one first vehicle power source for providing power to said first wheel shaft, said first wheel shaft being connected to a vehicle dynamometer system, said vehicle dynamometer system comprising a first controllable dynamometer power source for providing power to said first wheel shaft, said first dynamometer power source being an electrical machine comprising a stator and a rotor, said stator comprising a stator winding and said method including:
   determining whether a first temperature ($T_1$) is below a first temperature limit ($T_{lim1}$), said first temperature ($T_1$) representing a temperature of said electrical machine,
   heating said electrical machine by applying a current ($I_{heat}$) to said stator winding when said first temperature ($T_1$) is below said first temperature limit, said electrical machine being an asynchronous three-phase induction machine, and
   estimating said first temperature ($T_1$) through the use of a representation of heat transfer in said electrical machine,
   wherein said current ($I_{heat}$) is a current having a frequency such that the rotational speed of said rotor is kept below a predetermined speed.

2. Method according to claim 1, said first temperature ($T_1$) being a temperature being different from a temperature of said stator winding being supplied by said current ($I_{heat}$).

3. Method according to claim 1, further including:
   estimating said first temperature ($T_1$) at least partly by means of the amount of energy supplied by means of said current ($I_{heat}$).

4. Method according to claim 1, said representation of heat transfer taking a specific heat capacity of said electrical machine into account.

5. Method according to claim 1,
   further including, during heating of said electrical machine, determining a representation of a temperature of said stator winding, and, when said determined temperature reaches a third temperature limit $T_{lim3}$, interrupting said applying of said current, and, when said temperature of said stator winding has fallen to a first extent, resume the applying of said current ($I_{heat}$).

6. Method according to claim 5, further including:
   determining said representation of said temperature of said stator winding by means of a temperature sensor.

7. Method according to claim 1, said
   representation being any one from the group consisting of: a mathematical representation of the heat transfer of said electrical machine, an empirical representation of the heat transfer of electrical machine, and a thermodynamic model of said electrical machine.

8. Method according to claim 1, further including:
   applying said first current ($I_{heat}$) to said stator winding, said first current ($I_{heat}$) having a frequency such that the speed of said rotor being kept below a first speed.

9. Method according to claim 1, further including:
   applying said first current ($I_{heat}$) to said stator winding, said first current ($I_{heat}$) having a frequency being such that said rotor is not rotating.

10. Method according to claim 1, further including:
   said first current ($I_{heat}$) being a DC current.

11. Method according to claim 1, said stator winding comprising a plurality of phase windings, the method further including:
   applying a current to at least one of said phase windings.

12. Method according to claim 1,
   commencing said heating of said electrical machine prior to commencing testing of said vehicle.

13. Computer program included in a non-transitory computer readable media, said computer program comprising a program code which, when said program code is executed in a computer, causes said computer to perform the method according to claim 1.

14. Computer program product comprising a non-transitory computer-readable medium and a computer program according to claim 13, wherein said computer program is included in said computer-readable medium.

15. Vehicle dynamometer system for testing of a vehicle, said vehicle dynamometer system comprising at least one dynamometer test unit having at least a first controllable dynamometer power source being arranged to, in use, providing power to a first wheel shaft of a vehicle being tested, said first dynamometer power source being an electrical machine comprising a stator and a rotor, said stator comprising a stator winding, said dynamometer test system including:

means for determining whether a first temperature ($T_1$) is below a first temperature limit ($T_{lim1}$), said first temperature ($T_1$) representing a temperature of said electrical machine, and means for heating said electrical machine by applying a current ($I_{heat}$) to said stator winding when said first temperature is below said first temperature limit ($T_{lim1}$), said electrical machine being an asynchronous three-phase induction machine, wherein:

said means for heating said electrical machine by applying a current ($I_{heat}$) is arranged to apply a current having a frequency, such that the rotational speed of said rotor is kept below a predetermined speed, and said first temperature ($T_1$) is estimated through the use of a representation of heat transfer in said electrical machine.

16. Vehicle dynamometer system according to claim 15, wherein said first dynamometer test unit includes means for being rigidly coupled to said wheel shaft.

17. Vehicle dynamometer system according to claim 15, wherein said first dynamometer test unit is arranged to be connected to said vehicle by connecting the dynamometer test unit to a wheel hub of said wheel shaft by means of a direct-coupling.

18. Vehicle dynamometer system according to claim 15, wherein the dynamometer test unit is arranged to be standing freely on a surface and connected to the vehicle by means of a rigid coupling to the wheel shaft, while supporting the weight of the vehicle by means of said rigid coupling.

* * * * *